United States Patent
Tadokoro (10) Patent No.: US 6,374,284 B1
(45) Date of Patent: *Apr. 16, 2002

(54) INFORMATION PROCESSING METHOD AND APPARATUS AND A STORAGE MEDIUM

(75) Inventor: Yoshihisa Tadokoro, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/883,574

(22) Filed: Jun. 26, 1997

(30) Foreign Application Priority Data

Jul. 2, 1996 (JP) .............................. 8-172077

(51) Int. Cl.⁷ .............................................. G06F 9/46
(52) U.S. Cl. ...................................... 709/102; 345/804
(58) Field of Search ................................. 395/670, 677; 709/100, 102, 104, 107, 103, 105, 106; 345/803, 804, 839, 853; 707/530, 500.1

(56) References Cited

U.S. PATENT DOCUMENTS

| 5,109,510 A | * | 4/1992 | Baker et al. |
| 5,226,117 A | * | 7/1993 | Miklos ........................ 395/175 |
| 5,377,352 A | * | 12/1994 | Tanaka et al. |
| 5,386,504 A | * | 1/1995 | Yoda et al. |
| 5,758,081 A | * | 5/1998 | Aytac .......................... 709/212 |

* cited by examiner

Primary Examiner—Majid A. Banankhah
(74) Attorney, Agent, or Firm—Fitzpatrick, Cella, Harper & Scinto (57) ABSTRACT

An information processing method includes a first step of detecting, upon reception of an instruction to start a first program, if a second program which uses a resource to be used by the first program is already being executed, and a second step of terminating the execution of the second program and for starting the first program when it has been detected that the second program is being executed.

21 Claims, 4 Drawing Sheets

[ICON NAME]    [APPLICATION NAME]

EZCTRL      : CONTROLLER
FAX         : PC COLOR FAX
FLite       : PC COLOR FAX LITE
COPY        : PC COLOR COPY
CLite       : PC COLOR COPY LITE
FTRAN       : FILE TRANSFER
PBOOK       : TELEPHONE DIRECTORY

INFORMATION PROCESSING METHOD AND APPARATUS AND A STORAGE MEDIUM

BACKGROUND OF THE INVENTION

1. Field of the Invention

This invention relates to an information processing apparatus and method including a multitask OS (operating system), and to a storage medium.

2. Description of the Related Art

Conventionally, when intending to operate a plurality of application simultaneously which require a certain resource of a computer, an application program is started without checking whether or not another application program which requires the resource has already been started.

In the above-described conventional approach, however, conflict in use of the resource occurs because a plurality of application programs which require the same resource can be started simultaneously. As a result, in some cases, even if an instruction to start an application program is provided, the application program cannot actually be operated, or the operation of another application program being operated is hindered.

SUMMARY OF THE INVENTION

The present invention has been made in consideration of the above-described problems.

It is an object of the present invention to provide an information processing method and apparatus, and a storage medium in which conflict in a resource is prevented.

According to one aspect, the present invention which achieves the above-described object relates to an information processing method including a first step, of detecting, upon reception of an instruction to start a first program, whether a second program which uses a resource needed by the first program is already being executed, and a second step, of terminating execution of the second program and starting the first program, when it has been detected that such second program is being executed.

According to another aspect, the present invention which achieves the above-described object relates to a storage medium storing a readable program including a first step of detecting, upon reception of an instruction to start a first program, whether a second program which uses a resource needed by the first program is already being executed, and a second step of terminating execution of the second program and starting the first program, when it has been detected that such second program is being executed.

According to still another aspect, the present invention which achieves the above-described object relates to an information processing apparatus including first means for detecting, upon reception of an instruction to start a first program, whether a second program which uses a resource needed by the first program is already being executed, and second means for terminating the execution of the second program and for starting the first program, when it has been detected that such second program is being executed.

In one embodiment of the present invention, when an icon FTRAN is clicked, it is then determined if a FAX application program which uses the same resource used by a file transfer application program is already being executed. If the result of the determination is affirmative, one of the programs, either the FAX application program or the file transfer application program, can be selectively executed according to the user's instruction.

The foregoing and other objects, advantages and features of the present invention will become more apparent from the following description of the preferred embodiment taken in conjunction with the accompanying drawings.

DESCRIPTION OF THE PREFERRED EMBODIMENT

The preferred embodiment of the present invention will now be described in detail with reference to the drawings.

Figure 1:
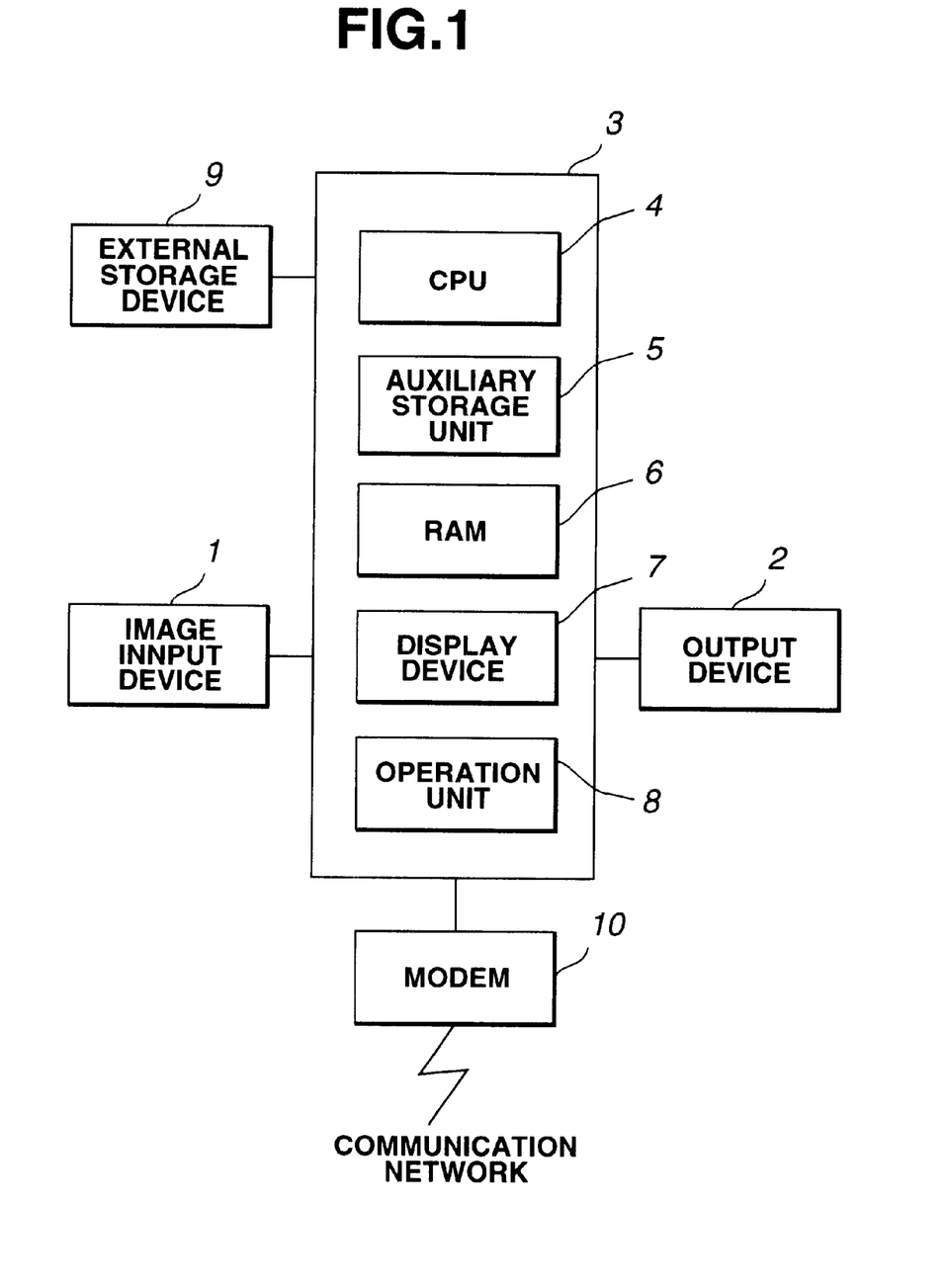
FIG. 1 is a system block diagram illustrating an information processing apparatus according to an embodiment of the present invention.

FIG. 1 is a system block diagram illustrating an information processing apparatus according to the embodiment.

In FIG. 1, reference numeral 1 represents an image input device, such as a color scanner or the like. Reference numeral 2 represents an output device (printer) capable of providing a color print, such as a color bubble-jet printer or the like. A main body 3 of a personal computer performs various kinds of image information processing including encoding/decoding of image information. The main body 3 of the personal computer includes a CPU (central processing unit) 4, an auxiliary storage unit 5, a RAM (random access memory) 6, a display device 7, and an operation unit 8. The auxiliary storage unit 5 includes a ROM (read-only memory) and a hard-disk drive. The main body 3 of the personal computer is operated according to a multitask OS based on programs stored in the auxiliary storage unit 5.

The display device 7 includes a CRT (cathode-ray tube) or a liquid-crystal panel, and can display the operational state and the environment of the system in detail as well as a processed image. An operation unit 8 includes a keyboard, and a pointing device, such as a mouse or the like, and can operate the main body 3 of the personal computer. Reference numeral 9 represents an external storage device, such as a floppy-disk drive, a CD(compact disc)-ROM drive or the like, which supplies the main body 3 of the apparatus with application programs for realizing a facsimile function, a file transfer function and the like from a storage medium, such as a floppy disk, a CD-ROM or the like. A modem (modulator-demodulator) 10 is connected to a communication network, such as a telephone line or the like, in order to communicate data with an external apparatus and perform control during the communication.

Figure 2:
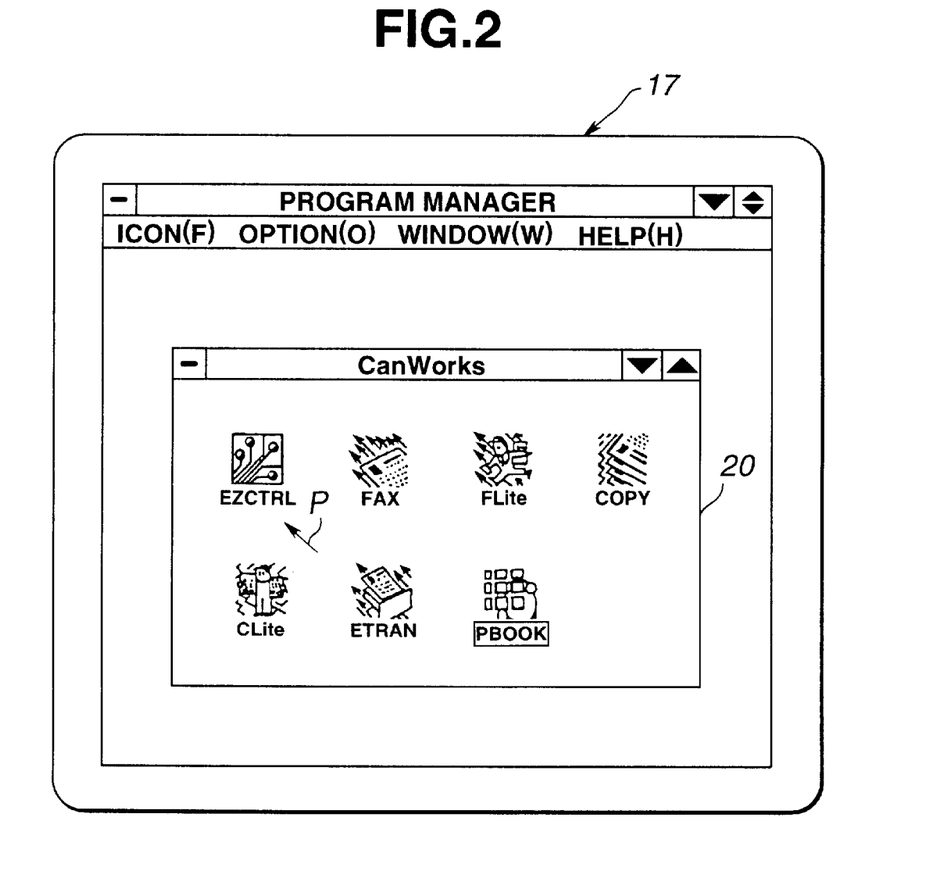
FIG. 2 is a diagram illustrating a display picture surface of a display device 7 shown in FIG. 1.

FIG. 2 is a diagram illustrating a display picture surface 17 of the display device 7.

On the display picture surface 17, a program manager is started by the main body 3 of the apparatus, and an icon for a function to be operated is selected, by being clicked on from among various functions (i.e., application programs) which can be used by the system of the embodiment.

Figure 3:
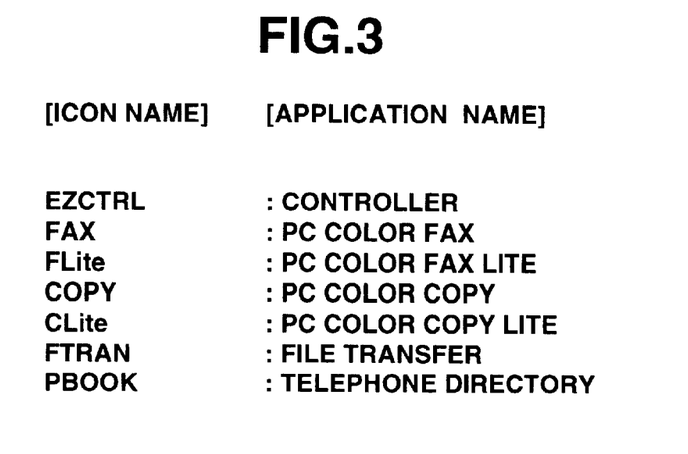
FIG. 3 is a diagram illustrating the correspondence between the icon name and the application name.

FIG. 3 is a diagram illustrating the correspondence between the icon name and the application name.

A description will now be provided of seven icons within a window 20 shown in FIG. 2 with reference to FIG. 3. An icon EZCTRL represents a command from a controller. By selecting the icon EZCTRL by moving a pointer P using a mouse or the like and performing a click, the command is made effective, so that the functions of six other icons can be controlled.

Icons FAX and Flite represent commands when using a color facsimile function. When the icon FAX is selected, an instruction to start an application "PC color FAX" (hereinafter termed "FAX")" is provided. When the icon Flite is selected, an instruction to start an application "PC color FAX Lite" is provided. (Operations using the application The operating method when selected via the icon Flite are a simplified version of those required with the application operating method when the icon FAX. An icon FTRAN represents a command when using a file transfer function. When the icon FTRAN is selected, an instruction to start an application "file transfer" is provided.

Icons COPY and CLite represent commands for using a copying function. When the icon COPY is selected, an instruction to start an application "PC color copy" is provided. When the icon CLite is selected, an instruction to start an application "PC color copy Lite" is provided. An icon PBOOK represents a command for using a telephone-directory function. When the icon PBOOK is selected, an instruction to start an application "telephone directory" is provided. Since the detailed operations which ensure upon selecting and clicking each of the icons are not directly related to the present invention, further description thereof will be omitted.

Figure 4:
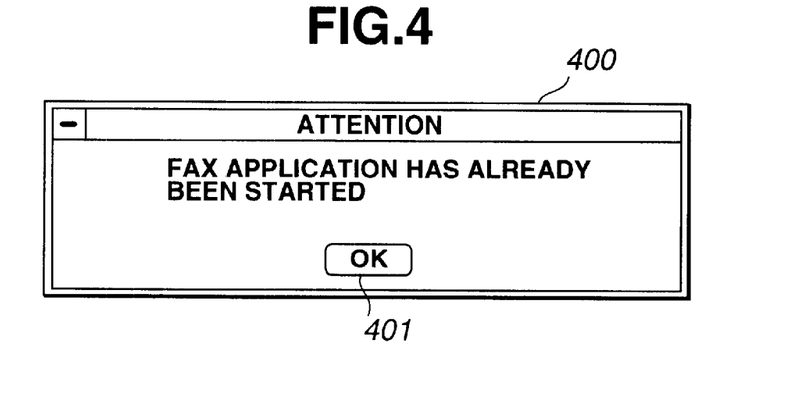
FIG. 4 is a diagram illustrating a window displayed on the display picture surface of the display device 7.

FIG. 4 is a diagram illustrating a window displayed on the display picture surface of the display device 7.

By displaying a message window 400 when a FAX application program has already been started, the user is notified of the name of that application program. The message window 400 is closed by clicking an OK button 401.

Figure 5:
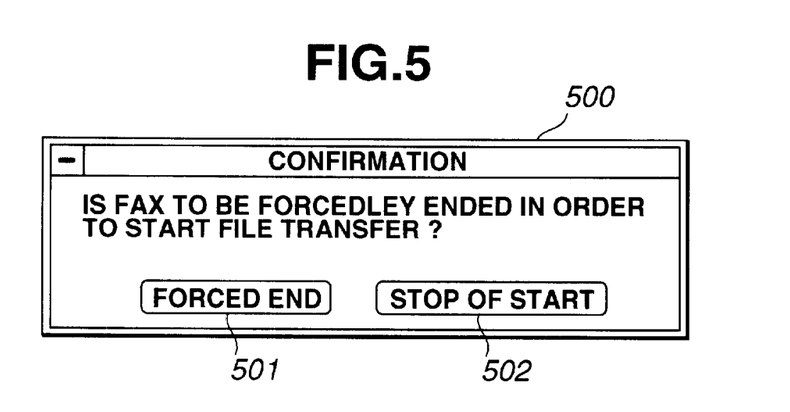
FIG. 5 is a diagram illustrating another window displayed on the display picture surface of the display device 7.

FIG. 5 is a diagram illustrating another window displayed on the display picture surface of the display device 7.

A window for selection 500 shown in FIG. 5 is displayed when the icon FTRAN is clicked after the FAX application program has already been started and is running. The window for selection 500 includes a forced-end button 501 and a stop-of-start button 502. When the button 501 is clicked, the FAX application program is forcedly ended. When the button 502 is clicked, the start of a file transfer application program is stopped.

The operation of the embodiment having the above-described configuration will now be described in detail with reference to the flowchart shown in FIG. 6.

Figure 6:
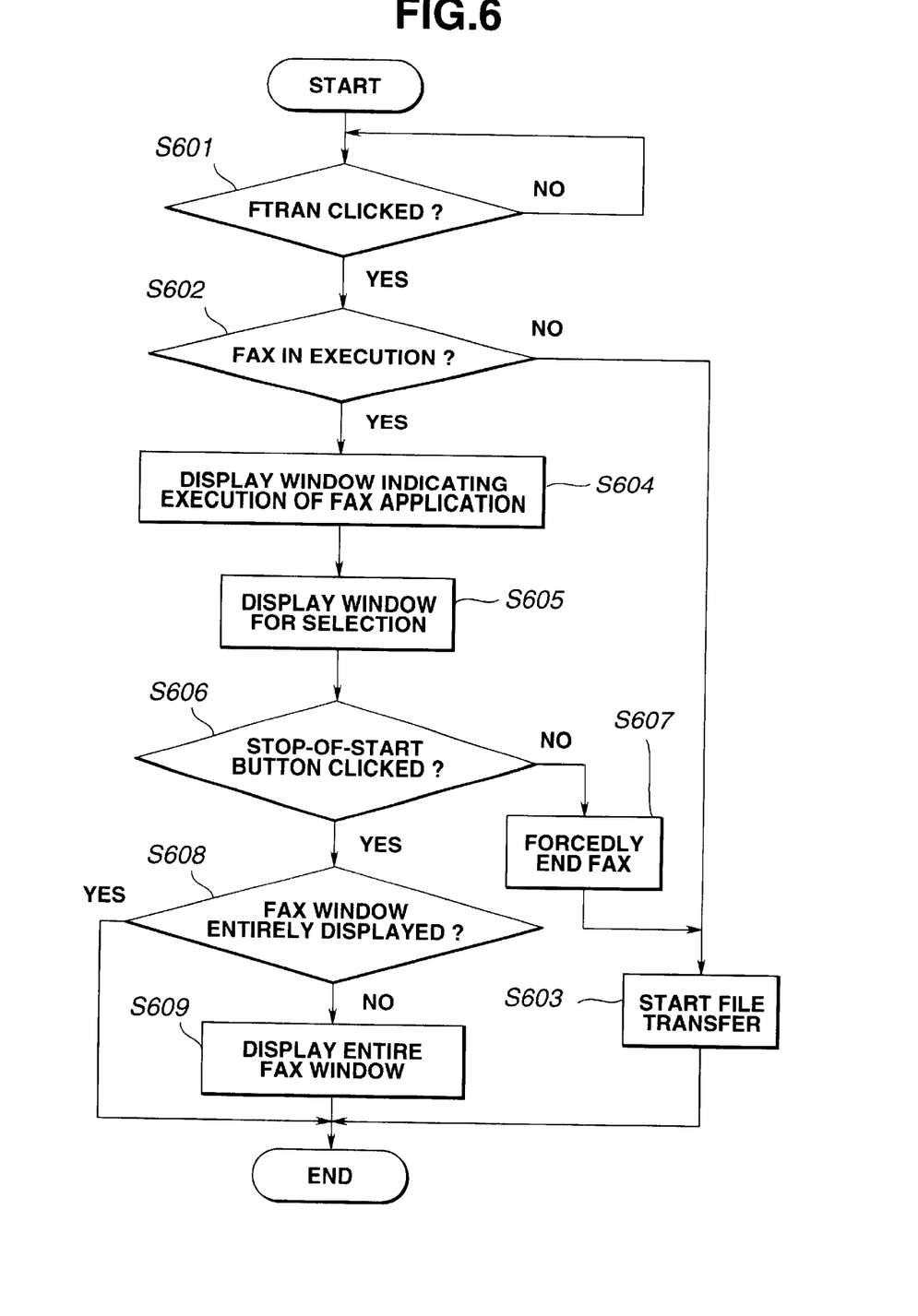
FIG. 6 is a flowchart illustrating the operation when starting a file transfer application program in the embodiment.

FIG. 6 is a flowchart indicating the operation when starting the file-transfer application program in the embodiment. A program represented by the flowchart is stored in advance in the auxiliary storage unit 5, or is supplied from the external storage device 9.

A description will be provided of a case in which, in the main body 3 of the personal computer where the modem 10, the image input device 1 and the output device 2 are connected and the Windows system is installed as the multitask OS, the FAX application program and the file transfer application program use the modem 10 as a common resource.

First, in step S601, it is determined if the icon FTRAN being clicked. If the result of the determination is YES, the process proceeds to step S602. In step S602, it is determined if the FAX application program is being executed. If the result of the determination in step S602 is NO, the process proceeds to step S603. In step S603, the file transfer application program is started, and the process is then terminated.

If the result of the determination in step S602 is YES, the process proceeds to step S604. In step S604, the message window 400 shown in FIG. 4 is displayed to notify the user of the fact that the FAX application has already been started. When the OK button 401 has been clicked, the process proceeds to step S605. In step S605, the window for selection 500 shown in FIG. 5 is displayed, and a message to ask the user to select whether the file transfer application program is to be started by forcedly ending the FAX application, or the start of the file transfer application program is to be stopped.

When the message for selection has been displayed, the process proceeds to step S606, where it is determined if the user has clicked the stop-of-start button 502 in the window for selection 500 shown in FIG. 5. If the result of the determination in step S606 is NO, it is determined that the forced-end button 501 has been clicked, and the process proceeds to step S607. In step S607, the FAX application program is forcedly ended. The process then proceeds to step S603, where the file transfer application program is started, and the process is then terminated.

On the other hand, if it is determined that the stop-of-start button 502 has been clicked during a predetermined time preceding period (YES), the process proceeds to step S608. In step S608, it is determined if the entire window of the FAX application is displayed. (If at least a part of the window of the FAX application is masked by another window, then the window of the FAX application is not entirely displayed.) If the result of the determination in step S608 is YES, the process is terminated. If the result of the determination in step S608 is NO, the process proceeds to step S609. In step S609, processing for performing display so that the entire window of the FAX application program can be seen, is performed, and the process is then terminated.

As described above, according to the embodiment, it is determined, when starting the file transfer application program, whether the FAX application program which requires the same resource is already being executed. If the result of the determination is affirmative, the start of the file transfer application program is stopped or the FAX application program being executed is forcedly ended, in accordance with the user's selection. It is thereby possible to prevent conflict in use of the resource due to simultaneous operations of a plurality of application programs which require the same resource (modem 10).

When starting the FAX application program while the file transfer application program is being executed, processing obtained by replacing "FAX" shown in the flow-chart by "file transfer" may be performed. Although in the foregoing embodiment, a description has been provided of the case in which the modem 10 is the resource upon which conflicting demands are made, the present invention may, of course, be applied to a case in which any other component (data, a program or a device) is the resource over which conflicts one to be prevented.

When data transmission is interrupted by the file transfer application program or the like while data is transmitted by the FAX application program, the FAX application program is automatically started after completing file transfer by the file transfer application to transmit succeeding data. For example, when FAX transmission is interrupted in the mid-course of a page, data of the interrupted page is transmitted beginning again from the head of the page.

The present invention may be applied to a system comprising a plurality of apparatuses, or to an apparatus comprising a single unit. The method of the invention may, of course, be applied to a case in which the object of the invention is achieved by supplying a system or an apparatus with a program. In such a case, by reading data from a storage medium storing a program represented by software for achieving the method of the invention into a system or an apparatus, the system or the apparatus can obtain the effects of the method of the invention.

As described above, according to the present invention, upon reception of an instruction to start a first program, it is detected whether a second program which uses a resource needed by the first program is already being executed. The execution of the second program is terminated and the first program is started when it has been detected that such second program is being executed. Accordingly, first and second programs using the same resource are not simultaneously executed, so that it is possible to prevent problems of the first program being unable actually to be operated due to conflict in access to the resource even if an instruction to start the first program is provided, and the operation of the second program being executed being hindered the attempted execution of the first.

The individual components designated by blocks in the drawings are all well-known in the information processing method/apparatus and storage device arts, and their specific construction and operation are not critical to the operation or the best mode for carrying out the invention.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing method comprising:
   a first step of detecting, upon reception of an instruction to start a first program, if a second program which uses a resource to be used by the first program is already being executed; and
   a second step of displaying a display screen to select whether the second program is to be continued or the second program is to be forcedly terminated to start the first program after displaying and confirming an interrupt message, when it has been detected in said first step that the second program is being executed.

2. An information processing method according to claim 1, wherein the second program is automatically re-started after completing the first program.

3. An information processing method according to claim 1, wherein said second step further comprises:
   a selecting step of selecting whether or not the first program is to be started by terminating the execution of the second program by detecting that the second program is being executed; and
   a window displaying step of displaying entirety of a window of the second program if at least a part of the window is not displayed, when the start of the first program has not been selected.

4. An information processing method according to claim 3, wherein said second step further comprises a title displaying step of displaying a title of the second step before said selecting step.

5. A storage medium for storing a readable program comprising:
   a first step of detecting, upon reception of an instruction to start a first program, if a second program which uses a resource to be used by the first program is already being executed; and
   a second step of displaying a display screen to select whether the second program is to be continued or the second program is to be forcedly terminated to start the first program after displaying and confirming an interrupt message, when it has been detected in said first step that the second program is being executed.

6. A storage medium according to claim 5, wherein said second step of said readable program further comprises:
   a selecting step of selecting whether or not the first program is to be started by terminating the execution of the second program by detecting that the second program is being executed; and
   a window displaying step of displaying entirety of a window of the second program if at least a part of the window is not displayed, when the start of the first program has not been selected.

7. A storage medium according to claim 6, wherein said second step of said readable program further comprises a title displaying step of displaying a title of the second step before said selecting step.

8. A storage medium according to any one of claims 5, 6 or 7, wherein said storage medium comprises a floppy disk.

9. A storage medium according to any one of claims 5, 6 or 7, wherein said storage medium comprises a CD-ROM (compact disk-read only memory).

10. An information processing apparatus comprising:
    first means for detecting, upon reception of an instruction to start a first program, if a second program which uses a resource to be used by the first program is already being executed; and
    second means for displaying a display screen to select whether the second program is to be continued or the second program is to be forcedly terminated to start the first program after displaying and confirming an interrupt message, when it has been detected in said first step that the second program is being executed.

11. An information processing apparatus according to claim 10, wherein said second means further comprises:
    selection means for selecting whether or not the first program is to be started by terminating the execution of the second program by detecting that the second program is being executed; and
    window display means for displaying entirety of a window of the second program if at least a part of the window is not displayed, when the start of the first program has not been selected.

12. An information processing apparatus according to claim 11, wherein said second means further comprises title display means for displaying a title of the second program before the selection of said selection means.

13. An information processing method according to claim 1, wherein the second program is a fax application program and the first program is a file transfer application program.

14. An information processing method according to claim 1, wherein the second program is a file transfer program and the first program is a fax application program.

15. An information processing method according to claim 1, wherein said resource comprises a modem.

16. A storage medium according to claim 5, wherein the second program is a fax application program and the first program is a file transfer application program.

17. A storage medium according to claim 5, wherein the second program is a file transfer program and the first program is a fax application program.

18. A storage medium according to claim 5, wherein said resource comprises a modem.

19. An image processing apparatus according to claim 10, wherein the second program is a fax application program and the first program is a file transfer application program.

20. An information processing apparatus according to claim 10, wherein the second program is a file transfer program and the first program is a fax application program.

21. An image processing apparatus according to claim 10, wherein said resource comprises a modem.

* * * * *

UNITED STATES PATENT AND TRADEMARK OFFICE
CERTIFICATE OF CORRECTION

PATENT NO. : 6,374,284 B1
DATED : April 16, 2002
INVENTOR(S) : Yoshihisa Tadokoro It is certified that error appears in the above-identified patent and that said Letters Patent is hereby corrected as shown below:

Drawings,
Sheet 1, FIG. 1, "INNPUT" should read -- INPUT --; and
Sheet 3, "FIG. 5, "FORCEDLEY" should read -- FORCEDLY --.

Column 1,
Line 13, "application" should read -- application programs --; and
Line 56, "the execution" should read -- execution --.

Column 2,
Line 65, "on" should read -- on, --.

Column 3,
Line 13, " "FAX)")" " should read -- "FAX") --;
Line 16, "The operating method when" should be deleted;
Line 18, "operating method when the icon" should read -- selected with the --; and
Line 30, "ensure" should read -- ensue --.

Column 4,
Line 2, "being" should read -- is being --; and
Line 62, "one" should read -- are --.

Column 5,
Line 27, "hindered" should read -- hindered by --;
Line 30, "well-known" should read -- well known --; and
Line 66, "entirety" should read -- the entirety --.

Column 6,
Line 24, "entirety" should read -- the entirety --; and
Line 54, "entirety" should read -- the entirety --.

UNITED STATES PATENT AND TRADEMARK OFFICE
CERTIFICATE OF CORRECTION

PATENT NO. : 6,374,284 B1
DATED : April 16, 2002
INVENTOR(S) : Yoshihisa Tadokoro It is certified that error appears in the above-identified patent and that said Letters Patent is hereby corrected as shown below:

<u>Column 8,</u>
Line 1, "image" should read -- information --; and
Line 7, "image" should read -- information --.

Signed and Sealed this

Fourth Day of February, 2003

JAMES E. ROGAN
*Director of the United States Patent and Trademark Office*